United States Patent
Blair et al.

(10) Patent No.: US 8,578,215 B2
(45) Date of Patent: Nov. 5, 2013

(54) METHOD AND SYSTEM FOR GATHERING DATA USING AUTOMATIC APPLIANCE FAILOVER

(75) Inventors: Timothy P. Blair, Boise, ID (US); James S Boyce, Meridian, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2220 days.

(21) Appl. No.: 09/992,666

(22) Filed: Nov. 19, 2001

(65) Prior Publication Data

US 2003/0097469 A1 May 22, 2003

(51) Int. Cl.
| G06F 11/00 | (2006.01) |
| G05B 11/01 | (2006.01) |
| G06F 11/30 | (2006.01) |
| G06F 15/173 | (2006.01) |
| G21C 17/00 | (2006.01) |
| H04M 3/00 | (2006.01) |
| H04M 5/00 | (2006.01) |

(52) U.S. Cl.
USPC ......... 714/44; 714/1; 714/2; 714/3; 714/47.1; 700/71; 702/186; 709/223; 709/224; 709/225; 709/234; 709/239; 379/248

(58) Field of Classification Search
USPC .......... 709/239, 223–225; 714/11, 43–48, 56, 714/1–5; 370/217, 225; 702/186; 379/248
See application file for complete search history.

(56) References Cited

U.S. PATENT DOCUMENTS

| 5,841,775 A | 11/1998 | Huang |
| 5,845,091 A * | 12/1998 | Dunne et al. ................ 709/240 |
| 5,859,959 A * | 1/1999 | Kimball et al. ................ 714/4 |
| 5,938,732 A | 8/1999 | Lim et al. |
| 6,078,957 A | 6/2000 | Adelman et al. |
| 6,098,107 A * | 8/2000 | Narvaez-Guarnieri et al. ............ 709/239 |
| 6,253,230 B1 | 6/2001 | Couland et al. |
| 6,347,078 B1 * | 2/2002 | Narvaez-Guarnieri et al. ............ 709/241 |
| 6,349,351 B1 | 2/2002 | Shimizu et al. |
| 6,370,119 B1 * | 4/2002 | Basso et al. ............ 370/252 |
| 6,421,317 B1 * | 7/2002 | Denecheau et al. .......... 370/222 |
| 6,434,637 B1 * | 8/2002 | D'Errico ................ 710/38 |
| 6,526,521 B1 * | 2/2003 | Lim ................ 714/4 |
| 6,560,717 B1 * | 5/2003 | Scott et al. ............ 714/4 |
| 6,581,104 B1 * | 6/2003 | Bereiter ................ 709/232 |

(Continued)

FOREIGN PATENT DOCUMENTS

| DE | 19903963 | 12/1999 |
| WO | 01/41362 | 6/2001 |

OTHER PUBLICATIONS

German Office Action, German Application No. 10249403.7, Aug. 26, 2005, pp. 1-7 (incl. English translation).

(Continued)

*Primary Examiner* — Asfand Sheikh

(57) ABSTRACT

A method for configuring data communication paths between a central controller and a plurality of devices is provided. The method ensures a first appliance is active. For each of the devices, a first communication capability is determined between the first appliance and the device. Signals indicative of the first communication capabilities are transmitted to the central controller. Respective communication paths are mapped between the central controller and the devices via the first appliance as a function of the first communication capabilities. The method ensures an automatic appliance failover is obtained.

15 Claims, 3 Drawing Sheets

(56) References Cited

U.S. PATENT DOCUMENTS

| | | | |
|---|---|---|---|
| 6,615,161 B1* | 9/2003 | Carney et al. | 702/186 |
| 6,618,360 B1* | 9/2003 | Scoville et al. | 370/248 |
| 6,629,148 B1* | 9/2003 | Ahmed et al. | 709/238 |
| 6,678,371 B1* | 1/2004 | Flockhart et al. | 379/265.02 |
| 6,697,333 B1* | 2/2004 | Bawa et al. | 370/238 |
| 6,704,812 B2* | 3/2004 | Bakke et al. | 714/4 |
| 6,725,401 B1* | 4/2004 | Lindhorst-Ko | 714/47 |
| 6,728,770 B1 | 4/2004 | Bradford et al. | |
| 6,735,631 B1* | 5/2004 | Oehrke et al. | 709/226 |
| 6,769,071 B1* | 7/2004 | Cheng et al. | 714/4 |
| 6,782,495 B2* | 8/2004 | Bernklau-Halvor | 714/44 |
| 6,785,015 B1* | 8/2004 | Smith et al. | 358/1.15 |
| 6,785,715 B2* | 8/2004 | Mizuno | 709/213 |
| 6,802,021 B1* | 10/2004 | Cheng et al. | 714/4 |
| 6,839,700 B2* | 1/2005 | Doyle et al. | 707/2 |
| 6,857,026 B1* | 2/2005 | Cain | 709/239 |
| 6,906,814 B1* | 6/2005 | Aonuma et al. | 358/1.15 |
| 6,944,675 B2* | 9/2005 | Fujita | 709/240 |
| 6,978,299 B1* | 12/2005 | Lodwick | 709/223 |
| 7,011,313 B2* | 3/2006 | Ueta et al. | 277/594 |
| 2003/0005119 A1* | 1/2003 | Mercier et al. | 709/225 |
| 2003/0016624 A1* | 1/2003 | Bare | 370/217 |

OTHER PUBLICATIONS

German Office Action, German Application No. 10249403.7, Feb. 9, 2006, pp. 1-5 (incl. English translation).

* cited by examiner

METHOD AND SYSTEM FOR GATHERING DATA USING AUTOMATIC APPLIANCE FAILOVER

FIELD OF THE INVENTION

The invention relates to gathering performance data for a plurality of devices communicating with a central controller via a plurality of appliances. More particularly, the invention relates to load balancing and failover services requiring little or no client involvement, and will be described with particular reference thereto. It will be appreciated, however, that the present invention is also amenable to other like applications.

BACKGROUND OF THE INVENTION

Reliable operation of devices (e.g., printers) within a computing network requires that certain parameters (e.g., status and usage) of the devices be monitored on a regular basis (e.g., weekly or even daily). A central controller evaluates the parameters gathered for the various devices during the monitoring process for scheduling maintenance and/or identifying devices that need immediate service.

Conventionally, the monitoring process includes surveying the network for identifying all of the devices and, furthermore, the respective network addresses of the identified devices. Since not all of the devices are capable of communicating with each of the other devices in the network, a mapping is then performed for identifying which of the devices are capable of communicating with each other. The mapping is transmitted to the central controller. Importantly, the mapping is merely a manual process performed by an operator and is based on the addresses of the devices within the network. Therefore, the operator typically relies on predetermined assumptions for determining which devices are capable of communicating with each other. For example, devices having similar addresses may be assumed to communicate with one another. However, because such assumptions are not always accurate, the mapping is often incorrect.

Once the central controller receives the mapping information, certain ones of the devices are designated as data collection devices. The data collection devices are chosen such that each of the devices in the network communicates with at least one of the data collection devices. Next, each of the devices is associated with one of the data collection devices. In this manner, assuming that each of the data collection devices monitors itself, each of the devices is monitored by the central controller via one of the data collection devices. Load balancing is achieved by associating approximately equal numbers of devices to the data collection devices.

Each of the data collection devices includes a software program that, when executed, evaluates the status of the respective associated devices. Data (e.g., usage data or diagnostic data used for scheduling maintenance and/or repairs) gathered by the data collection devices is transmitted to the central controller via, for example, e-mail. The central controller dispatches maintenance and/or repair orders according to previously determined criteria.

There are several drawbacks to the conventional process for gathering the desired device usage data. For example, because the central controller does not actually control the data collection devices, the operators of the data collection devices must manually execute the program to gather the desired data. Since the data collection process can be time consuming, operators of the data collection devices typically only initiate the program on an infrequent basis (e.g., monthly). Consequently, devices requiring immediate repair may not be identified on a timely basis.

Another drawback to the conventional process is evident when one or more of the data collection devices fails. In this case, the central controller cannot redirect a remaining one of the other data collection devices to gather the status data from the devices associated with the failed data collection device.

Furthermore, as discussed above, because the mapping between the data collection devices and other devices is not always accurate, the central controller may not receive status data from all of the devices in the network.

The present invention provides a new and improved apparatus and method which overcomes the above-referenced problems and others.

SUMMARY OF THE INVENTION

In one embodiment of the present invention, a method for configuring data communication paths between a central controller and a plurality of devices is provided. The method ensures a first appliance is active. For each of the devices, a first communication capability is determined between the first appliance and the device. Signals indicative of the first communication capabilities are transmitted to the central controller. Respective communication paths are mapped between the central controller and the devices via the first appliance as a function of the first communication capabilities to obtain automatic appliance failover.

In another aspect of the present invention, a method is provided for gathering diagnostic data, which are associated with a plurality of devices, within a central processing unit. A determination is made as to which of a plurality of intermediate collectors are capable of communicating with the respective devices. A notification signal is received within the central processing unit that one of the intermediate collectors is available. One of the devices is identified for which the diagnostic data is desired. A determination is made as to whether the identified device is capable of communicating with the available intermediate collector. If the identified device is capable of communicating with the available intermediate collector, a request signal is transmitted from the central processing unit to the available intermediate collector requesting the diagnostic data for the identified device. Signals indicative of the diagnostic data are transmitted from the identified device to the central processing unit via the available intermediate collector. In this manner, automatic intermediate collector failover is obtained.

In another aspect of the present invention, a plurality of signals executable on a computing device, including a plurality of appliances, a plurality of devices, each of which communicates with at least one of the appliances, means for ensuring each of the appliances is active, means for determining which of the appliances communicate with the respective devices, and a central controller, which communicates with each of the appliances, include a notification signal and an identification signal. The notification signal is transmitted to the central controller and indicates that one of the appliances is available. The identification signal identifies at least one of the devices capable of communicating with the available appliance for which the diagnostic data is desired. In this manner, automatic appliance failover is obtained.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

DETAILED DESCRIPTION OF ILLUSTRATED EMBODIMENT

The following includes definitions of exemplary terms used throughout the disclosure. Both singular and plural forms of all terms fall within each meaning:

"Computer Readable Medium", as used herein, includes but is not limited to any memory device, storage device, compact disc, floppy disk, or any other medium capable of being interpreted by a computer.

"Software", as used herein, includes but is not limited to one or more computer executable instructions, routines, algorithms, modules or programs including separate applications or from dynamically linked libraries for performing functions and actions as described herein. Software may also be implemented in various forms such as a servlet, applet, stand-alone, plug-in or other type of application. Software can be maintained on various computer readable mediums as is known in the art.

"Signals", as used herein, includes but is not limited to one or more signals, a bit stream, an algorithm, a routine, a program or the like. The term "commands" is synonymous with "signals."

"Network", as used herein, includes but is not limited to the internet, intranets, Wide Area Networks (WANs), Local Area Networks (LANs), and transducer links such as those using Modulator-Demodulators (modems).

"Internet", as used herein, includes a wide area data communications network, typically accessible by any user having appropriate software.

"Intranet", as used herein, includes a data communications network similar to an internet but typically having access restricted to a specific group of individuals, organizations, or computers.

Figure 1:
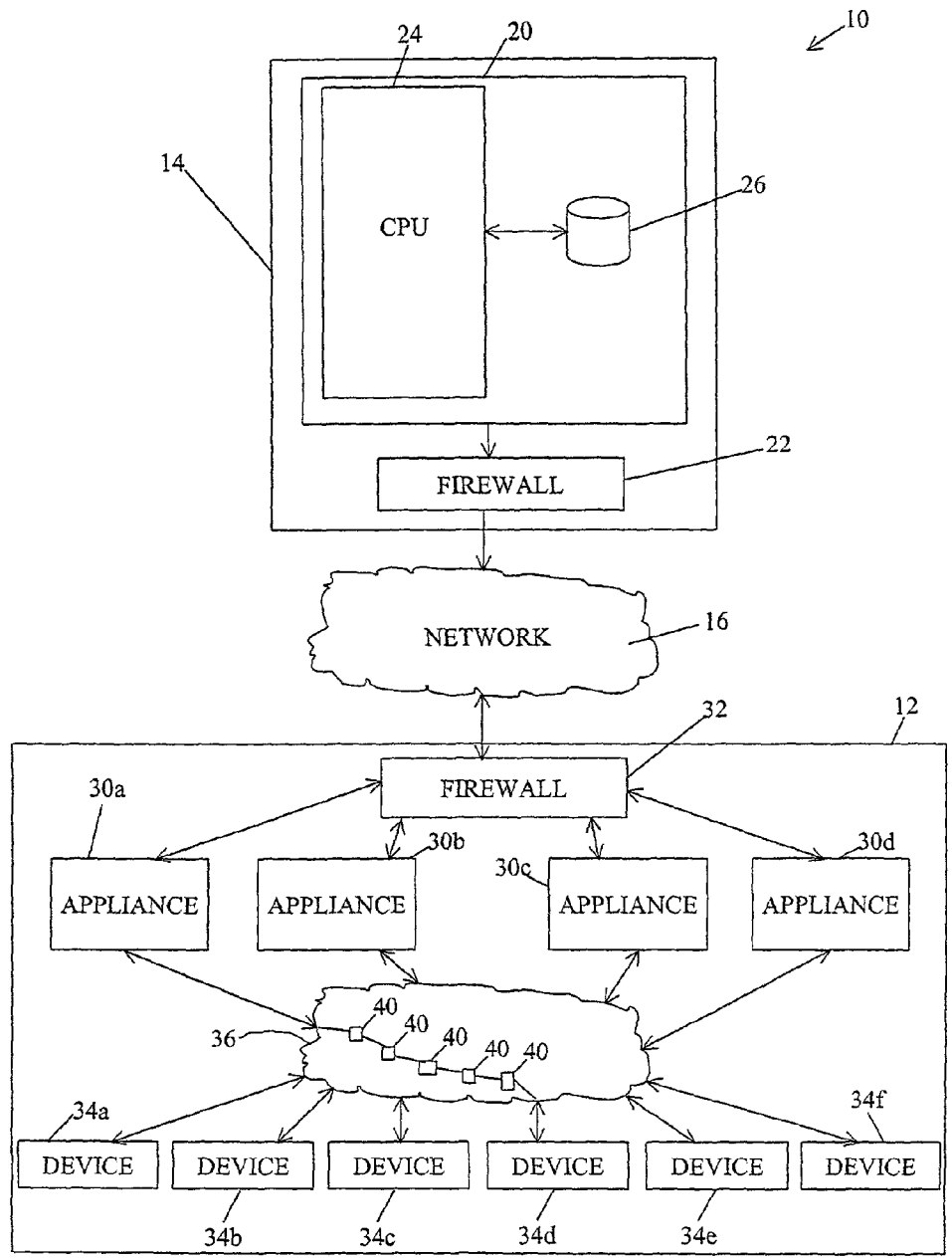
FIG. 1 is an exemplary overall system diagram for gathering diagnostic data in accordance with the present invention.

Illustrated in FIG. 1 is an exemplary overall system diagram in accordance with the present invention. One embodiment of a system 10 for gathering diagnostic data signals includes a local site 12 that communicates with a remote site 14 via an external network 16 (e.g., an Internet). As will be discussed in more detail below, the remote site 14 includes a central controller 20 that communicates with the external network 16. Optionally, the central controller 20 communicates with the external network 16 via a remote site firewall 22. The central controller 20 includes a central processing unit 24 and a storage device 26.

The local site 12 includes a plurality (e.g., four (4)) of appliances 30a, 30b, 30c, 30d that communicate with the central controller 20 via the external network 16 and, optionally, a local site firewall 32. In the illustrated embodiment, the appliances 30 are typically "headless" computers, which include central processing units (but no keyboards or monitors), that are controlled by the central controller 20 via the external network 16. In this sense, the appliances 30 are slaves to the central controller 20. A plurality (e.g., six (6)) of devices 34a, 34b, 34c, 34d, 34e, 34f, which in one embodiment are output devices (e.g., printing devices), communicate with the appliances 30 via an internal network 36 (e.g., an intranet). In the illustrated embodiment, the number of devices 34 typically exceeds the number of appliances 30. However, other embodiments, in which the number of devices is less than or equal to the number of appliances, are also contemplated.

In the illustrated embodiment, the devices 34 at the local site 12 are manufactured and/or maintained by the remote site 14. Therefore, the central controller 20 gathers data used to schedule maintenance and/or repairs for the devices 34. The data gathered by the central controller 20 is diagnostic data signals transmitted from the devices 34 to the central processor 20 (via the appliances) according to a method described below. Typically, the diagnostic data signals provide information describing how much each of the devices has been used (e.g., usage data) and/or problems that have developed with the devices that have not been corrected.

Figure 2:
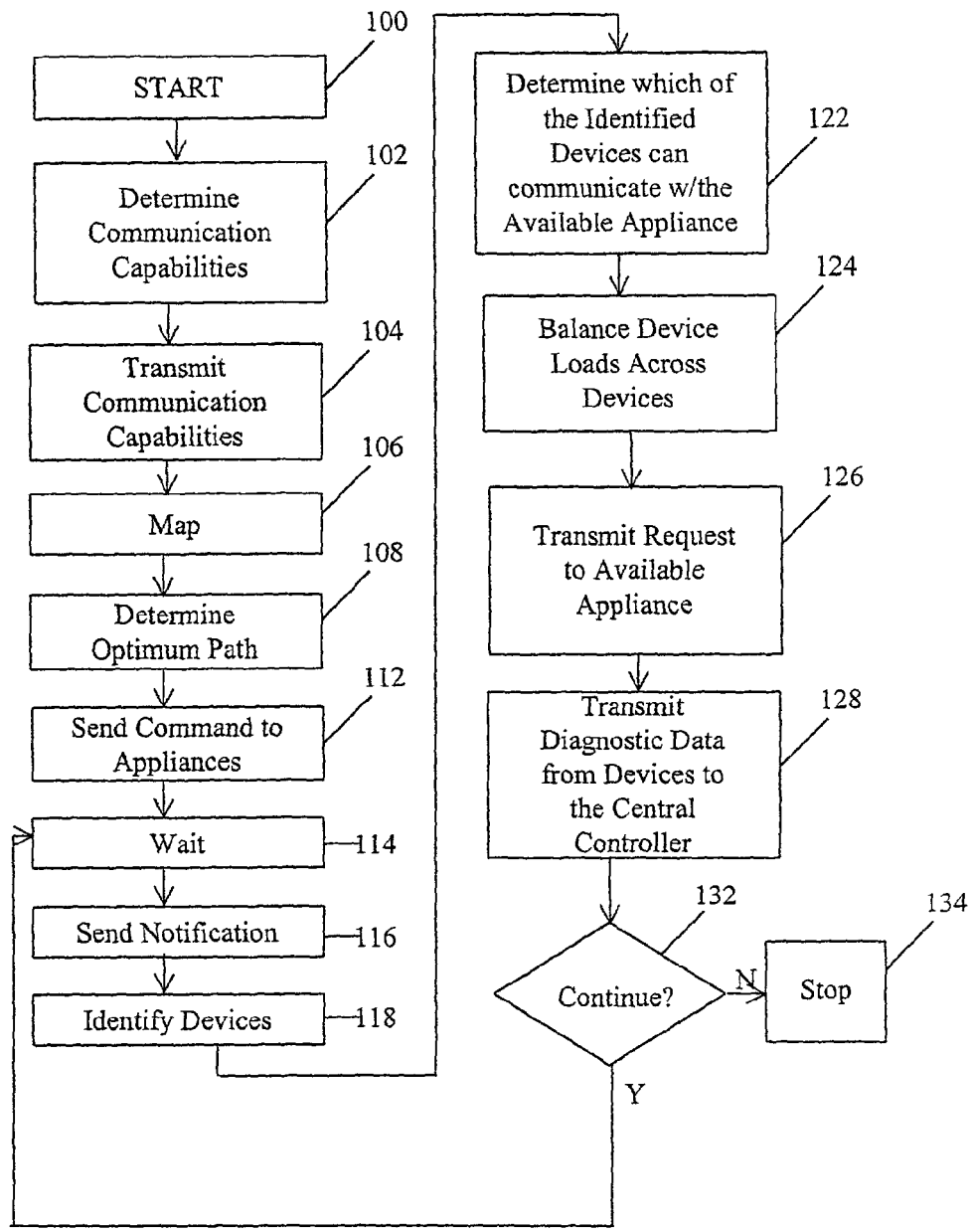
FIG. 2 is an exemplary methodology of gathering diagnostic data in accordance with the present invention.

Illustrated in FIG. 2 is an exemplary computer-implemented methodology of gathering data used to schedule maintenance and/or repairs in accordance with the present invention. The blocks shown represent functions, actions or events performed therein. It will be appreciated that computer software applications involve dynamic and flexible processes such that the illustrated blocks can be performed in other sequences different than the one shown. It will also be appreciated by one of ordinary skill in the art that the software of the present invention may be implemented using various programming approaches such as procedural, object oriented or artificial intelligence techniques.

With reference to FIGS. 1 and 2, the process for gathering data used to schedule maintenance and/or repairs for the devices 34 begins in a block 100. A determination is made, in a block 102, as to which of the appliances 30 are capable of communicating with the respective devices 34. In one embodiment, the means for determining implemented in the block 102 involves the appliances 30 "pinging" the devices 34 (transmitting respective detection signals (ping signals)) and waiting for respective responses. If, for example, the appliance 30a hears a response to the ping sent to the device 34c, it is determined that the appliance 30a is capable of communicating with the device 34c; otherwise, it is determined no communication is possible between the two components. Although "pinging" is used as the means for determining which of the appliances communicate with the respective devices, other means (e.g., manual means) are also contemplated.

Signals (identification signals) indicative of the communication capabilities are transmitted, in a block 104, from each of the appliances 30 to the central controller 20 and stored in the storage device 26. Respective communication paths are mapped, in a block 106, between the central controller 20 and each of the devices 34 as a function of the communication capabilities. More specifically, if the communication capability signals transmitted in the block 104 indicate that the device 34a is capable of communicating with the central controller 20 via two (2) of the appliances 30b, 30d, two communication paths are mapped between the central controller 20 and the device 34a in the block 106.

In one embodiment, each of the appliances 30 and the devices 34 is identified by respective network identifiers (e.g., addresses). Consequently, the signals transmitted in the block 104 include the addresses of each of the appliances 30 along with the corresponding devices 34 with which the appliances 30 can communicate. In this case, the mapping block 106 stores a list of identifiers in the storage device 26. The list of identifiers indicates which devices 34 are capable of communicating with the respective appliances 30.

The pings sent from the appliances 30 are useful for providing additional information about the communication capabilities. For example, the number of routers 40 (or hops) between the appliances 30 and the respective devices 34 is typically encoded in the response to the ping. FIG. 1 illustrates six (6) routers 40 between the appliance 30a and the device 34d. Fewer routers may mean there is less probability one of the routers in the path between the appliance and the device will become unavailable (i.e., go "down"). Furthermore, the appliance 30 may determine the length of time that passes before receiving the response. A shorter length of time between the time the ping was sent and the time a response was received may indicate faster responses in the future (even if the signal passes through more routers). The number of routers between the appliance and device and/or the length of time that elapses between the ping and a corresponding response is optionally used by the central controller 20, in a block 108, for determining an optimal path. The optimal path represents a preferred path between the central controller 20 and a device 34. Depending on the criteria used (e.g., fewest number of routers or shortest time), only one of the appliances 30 is selected in the block 108 as providing the optimal path between the central controller 20 and the respective device 34.

The central controller 20 sends a command to each of the appliances 30, in a block 112, that instructs the appliances 30, upon becoming available, to notify the central controller 20. Then, in a block 114, the central controller 20 waits to receive a notification from one of the appliances 30. Upon becoming available, one of the appliances 30 (e.g., the appliance 30c) notifies the central controller 20 in a block 116. After receiving the notification, the central processor 20 identifies, in a block 118, one or more of the devices 34 for which the diagnostic data signals are desired. Then, in a block 122, the central controller 20 determines which of the identified devices 34 is/are capable of communicating with the available appliance 30c. In one embodiment, the determination is made by comparing the device and appliance identifiers according to the communication capability mapping stored in the storage device 26 during the block 106. Optionally, the block 118 determines that only the identified devices 34 having an optimal path with the available appliance 30c communicate with the appliance 30c.

In a block 124, the central controller 20 balances the device loads across the appliances 30. More specifically, if five (5) of the devices 34a, 34b, 34d, 34e, 34f are identified in the blocks 118, 122, the central controller 20 optionally determines in the block 124 that the desired diagnostic data signals may be gathered more efficiently by utilizing other ones of the appliances 30a, 30b, 30d, 30e (rather than the appliance 30c) as those appliances become available in the future. For example, if the device 34a and the devices 34b, 34e communicate with the appliances 30b, 30e, respectively, the central controller 20 may execute instructions (signals) to delay gathering the diagnostic data signals for those devices 34a, 34b, 34e until the appliances 30b, 30e become available (even if the appliances 30b, 30e do not offer the optimal paths to the devices 34a, 34b, 34e). Therefore, the currently available appliance 30c will only be used to gather data signals for the devices 34d, 34f. In this manner, the device loads are balanced across the appliances 30.

As discussed above, the appliances 30 notify the central controller 20 of availability to retrieve diagnostic data signals. Furthermore, each of the appliances 30 is typically capable of communicating with a plurality of the devices 34. Therefore, if any of the appliances 30 become disabled (e.g., go "down"), there is a high probability that the central controller 20 is capable of communicating with the devices 34 mapped to the disabled appliance via the other appliances. Such flexibility is referred to as automatic appliance failover.

Figure 3:
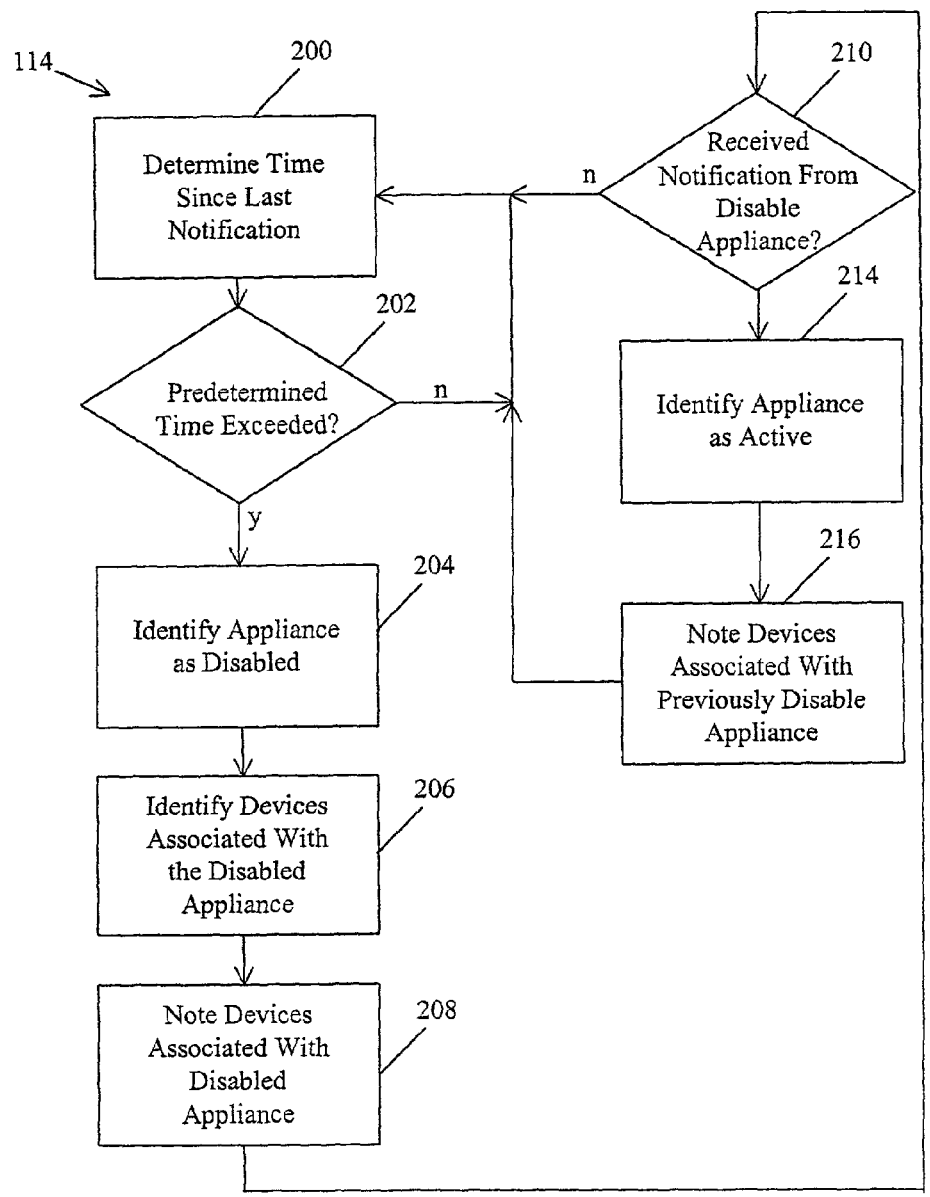
FIG. 3 is an exemplary methodology of ensuring the appliances are active in accordance with the present invention.

With reference to automatic appliance failover, the central controller 20 is never actually notified that one of the appliances 30 is disabled. Instead, with reference to FIGS. 1-3, the central controller 20 provides a means for ensuring each of the appliances is active. More specifically, the block 114 of waiting includes determining, in a block 200, within the central controller 20, a length of time since receiving a notification from each of the appliances 30. A determination is made, in a block 202, whether the predetermined length of time for a particular appliance has been exceeded. If the predetermined time has not been exceeded, control returns to the block 200. If, on the other hand, the predetermined time has been exceeded, control passes to a block 204 for identifying the respective appliance as disabled. Then, in a block 206, the devices 34 that have an optimal path to the central controller 20 via the disabled appliance (i.e., the devices associated with the disabled appliance) are identified. The devices identified in the block 206 are noted, in a block 208, so that the block 118 will not require the central controller 20 to communicate with those devices via the respective optimal paths. Then, in a block 210, a determination is made whether the central controller 20 has received notification from any of the disabled appliances. If the central controller 20 has not received such notification, control returns to the block 200; otherwise control passes to a block 214. In the block 214, the previously disabled appliance is identified as active. Then, in a block 216, the devices associated with the previously disabled appliance are noted so that the block 118 may require the central controller 20 to communicate with those devices via the respective optimal paths. Control then returns to the block 200. In this sense, the system 10 automatically provides failover when any of the appliances 30 become disabled. In other words, if an appliance becomes disabled, and the central controller 20 communicates with one of the devices via an optimal path including the disabled appliance, the system 10 automatically retrieves the desired diagnostic data signals from the device via another one of the appliances.

With reference again to FIGS. 1 and 2, once a final determination of the devices (e.g., the devices 34d, 34f) for which information is to be gathered is made in the block 124, the central controller 20 transmits, in a block 126, a signal indicating a request to the available appliance 30c to gather the diagnostic data signals from the devices 34d, 34f. The signals indicative of the requested diagnostic data are transmitted from the devices 34d, 34f to the central controller 20 via the available appliance 30c in a block 128. In one embodiment, the appliances 30 gather the diagnostic data signals before transmitting the signals to the central controller 20. Therefore, the appliances 30 act as intermediate data collectors and, furthermore, automatic intermediate data collector failover is achieved in a similar manner to the automatic appliance failover described above.

A determination is made, in a block 132, whether to continue gathering the diagnostic data signals. If more diagnostic data signals are required, control returns to the block 114; otherwise, control passes to a block 134 for stopping the process.

Because the central controller 20 is automatically notified whenever the appliances 30 become available, the process for gathering the diagnostic data signals is controlled by the central controller 20. More specifically, the central controller 20 sends a request to the available appliances 30 on a regular basis (e.g., weekly). Therefore, devices requiring maintenance/repair are identified on a timely basis.

As discussed above, the local and remote sites 12, 14, respectively, communicate with the external network 16 via firewalls 32, 22. The firewalls 32, 22 provide security by limiting unauthorized access to the local and remote sites 12, 14, respectively, from the external network 16.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For example, although the invention has been described as including a local site having devices, which are monitored by a central controller at a remote site, it is to be understood that the devices and central controller may be located locally with respect to each other. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A method for configuring data communication paths between a central controller and a plurality of printing devices via a plurality of appliances, the method comprising:

ensuring one or more appliances of the plurality of appliances are active where an appliance is a computer remote from the central controller configured to collect diagnostic data from one or more of the plurality of printing devices and to transmit the diagnostic data to the central controller;

for each of the printing devices, determining communication capabilities with the one or more appliances to determine communication paths between the plurality of printing devices and the one or more appliances;

transmitting signals indicative of the communication capabilities to the central controller; and mapping respective communication paths between the central controller and the printing devices via the one or more appliances as a function of the communication capabilities to obtain an automatic appliance failover to allow diagnostic data to be collected from a selected printing device by way of multiple appliances.

2. The method for configuring data communication paths as set forth in claim 1, further including:

for each of the printing devices, identifying an optimal path between the appliance and the printing device; and wherein the mapping includes:

mapping the respective communication paths between the central controller and the printing devices as a function of the optimal paths.

3. The method for configuring data communication paths as set forth in claim 2, wherein the identifying includes at least one of:

determining one of a plurality of paths between a selected appliance and a selected printing device having a least number of hops; and determining one of a plurality of paths between the selected appliance and the selected printing device achieving a shortest communication time.

4. The method for configuring data communication paths as set forth in claim 1, further including:

for each of the printing devices, determining a second communication capability between a second appliance and the printing device;

transmitting signals indicative of the second communication capabilities to the central controller; and wherein the mapping includes:

mapping the respective communication paths between the central controller and the printing devices via the first and second appliances as a function of the first and second communication capabilities.

5. The method for configuring data communication paths as set forth in claim 4, wherein the mapping includes:

substantially balancing respective printing device loads across the appliances.

6. A method for gathering diagnostic data, which are associated with a plurality of printing devices, by a central processing unit via a plurality of intermediate collectors that are connected to one or more of the plurality of printing devices through a network, where an intermediate collector is a computer remote from the control processing unit configured to collect diagnostic data from a selected printing device, the method comprising:

determining which of the plurality of intermediate collectors are capable of communicating with one or more of the plurality of printing devices to obtain a communication map to allow an automatic intermediate collector failover to occur if an intermediate collector falls to operate;

receiving a notification signal within the central processing unit that one of the intermediate collectors is available;

identifying one of the printing devices for which the diagnostic data is desired;

determining whether the identified printing device is capable of communicating with the available intermediate collector;

if the identified printing device is capable of communicating with the available intermediate collector:

transmitting a request signal from the central processing unit to the available intermediate collector requesting the diagnostic data for the identified printing device; and transmitting signals indicative of the diagnostic data from the identified printing device to the central processing unit via the available intermediate collector.

7. The method for gathering diagnostic data as set forth in claim 6, further including:

determining optimal paths from each of the printing devices to the central processing unit via respective ones of the intermediate collectors; and wherein the determining whether the identified printing device is capable of communicating with the available intermediate collector includes:

determining whether the identified printing device has an optimal path including the available intermediate collector.

8. The method for gathering diagnostic data as set forth in claim 7, further including:

if the central processing unit has not received the notification signal for a predetermined time that one of the intermediate collectors is available, retrieving the signals indicative of the diagnostic data for the printing devices having the respective optimal paths including the intermediate collector via another one of the intermediate collectors.

9. The method for gathering diagnostic data as set forth in claim 6, further including:

identifying an additional printing device for which the diagnostic data is desired;

determining whether the additional identified printing device is capable of communicating with the available intermediate collector;

if the identified printing device and the additional identified printing device are capable of communicating with the available intermediate collector:
  determining a balanced load for the available intermediate collector to include at least one of the identified printing devices;
  transmitting a request signal from the central processing unit to the available intermediate collector requesting the diagnostic data for the balanced load; and
  transmitting signals indicative of the diagnostic data from the balanced load to the central processing unit via the available intermediate collector.

10. The method for gathering diagnostic data as set forth in claim 9, wherein the determining the balanced load includes:
  determining whether at least one of the identified printing devices is capable of communicating with another one of the intermediate collectors.

11. The method for gathering diagnostic data as set forth in claim 6, further including:
  transmitting signals indicative of identifiers of the Intermediate collectors and the respective printing devices with which the intermediate identifiers are capable of communicating to the central processing unit; and
  wherein the determining whether the identified printing device is capable of communicating with the available intermediate collector includes:
  comparing the identifier of the identified printing device with the identifiers of the printing devices capable of communicating with the available intermediate collector.

12. A system comprising:
  a plurality of printing devices;
  a plurality of appliances where an appliance is a computer configured to collect diagnostic data from one or more of the plurality of printing devices;
  a communication network configured to provide a plurality of communication paths between components connected to the communication network;
  the plurality of printing devices and the plurality of appliances being connected to the communication network where communication paths are provided between one or more of the plurality of printing devices and one or more of the plurality of appliances;
  a controller remote from the appliances configured to communicate with the plurality of appliances and being configured to generate a map of the communication paths between the printing devices and the appliances based on signals received from the plurality of appliances;
  the controller being configured to receive, from a first appliance from the plurality of appliances, diagnostic data relating to a selected printing device; and
  the controller being configured to perform an automatic appliance failover to a second appliance using the map of the communication paths if the first appliance is disabled in order to receive the diagnostic data relating to the selected printing device.

13. The system of claim 12 further including means for automatically mapping the communication paths based on signals received from the plurality of appliances.

14. The system of claim 12 further including means for ensuring each of the appliances is active.

15. The system of claim 12 further including means for identifying addresses of the appliances and addresses of the printing devices with which the appliances are capable of communicating.

* * * * *

UNITED STATES PATENT AND TRADEMARK OFFICE
CERTIFICATE OF CORRECTION

PATENT NO. : 8,578,215 B2  Page 1 of 1
APPLICATION NO. : 09/992666
DATED : November 5, 2013
INVENTOR(S) : Timothy P. Blair et al.

It is certified that error appears in the above-identified patent and that said Letters Patent is hereby corrected as shown below:

Claims

In column 9, lines 21-22, in Claim 11, delete "Intermediate" and insert -- intermediate --, therefor.

Signed and Sealed this
Eighth Day of December, 2015

Michelle K. Lee
*Director of the United States Patent and Trademark Office*